UNITED STATES PATENT OFFICE.

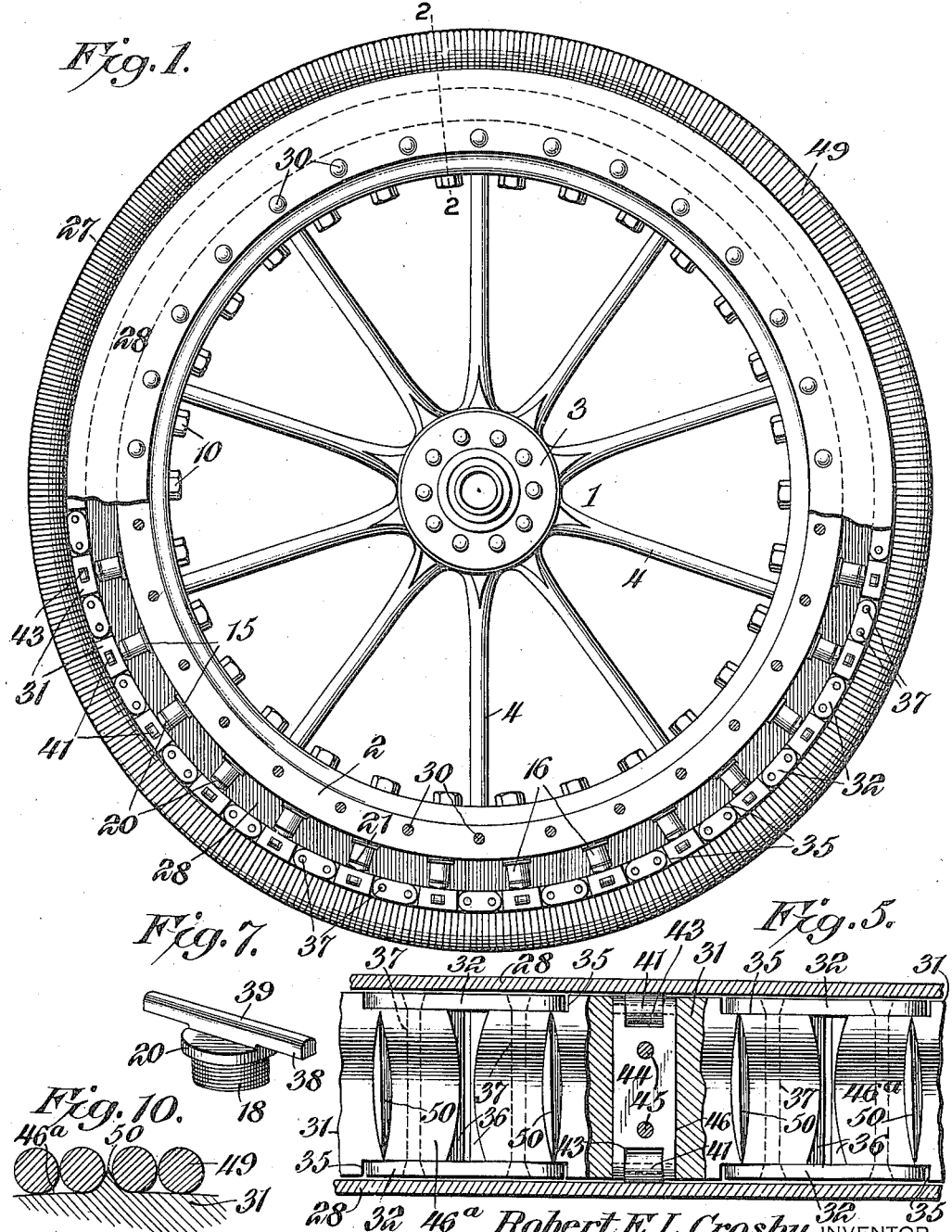

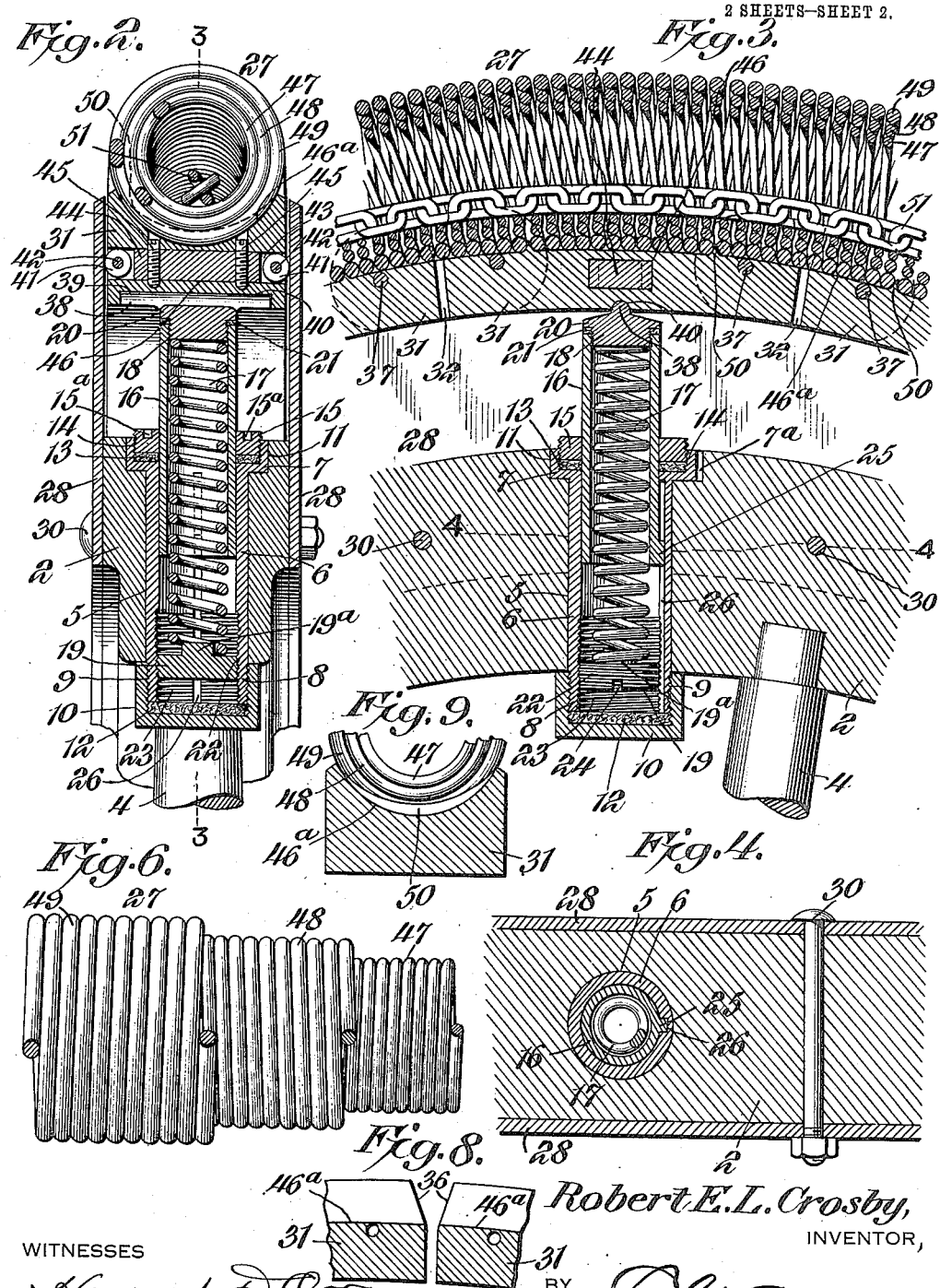
R. E. L. CROSBY.
WHEEL FOR AUTOMOBILES, &c.
APPLICATION FILED MAR. 1, 1912.
1,093,115.
Patented Apr. 14, 1914.
2 SHEETS—SHEET 2.
Robert E. L. Crosby, INVENTOR,
WITNESSES
BY
ATTORNEY

ROBERT E. L. CROSBY, OF JONESBORO, ARKANSAS.

WHEEL FOR AUTOMOBILES, &c.

1,093,115.  Specification of Letters Patent.  Patented Apr. 14, 1914.

Application filed March 1, 1912. Serial No. 680,870.

*To all whom it may concern:*

Be it known that I, ROBERT E. L. CROSBY, a citizen of the United States, residing at Jonesboro, in the county of Craighead and State of Arkansas, have invented a new and useful Wheel for Automobiles, &c., of which the following is a specification.

The invention relates to improvements in wheels for automobiles, etc.

The object of the present invention is to improve the construction of wheels for automobiles, and other motor vehicles, and to provide simple, efficient and noiseless resilient means of great strength and durability, designed to be mounted on a rigid vehicle wheel and including a round resilient tire, and capable of a cushioning action similar to that, which occurs in a pneumatic tire without flattening the round tread of the wheel at the bottom where the pressure and the consequent cushioning action occurs, so that the suction, which frequently occurs with the flattening of pneumatic tires in muddy places, will have no effect on the wheel.

A further object of the invention is to provide cushioning means of this character, equipped with an annular series of radially arranged coiled springs, so constructed and supported that only the springs at the bottom of the wheel will be compressed while the other springs will remain free and unaffected by the strains incident to the cushioning action of the wheel.

Another object of the invention is to provide a wheel having a tire constructed of spirally coiled material, forming a continuously corrugated anti-skidding tread and so constructed and arranged that the pressure on the tire will not operate to open the coils or convolutions in contact with the supporting surface but will maintain such coils or convolutions in contact with one another and thereby prevent the tire from picking up gravel, or allowing dust, dirt, or other accumulation to be forced through the coils.

The invention also has for its object to provide cushioning means in which there will be a relatively small amount of movement of the parts in their cushioning action, and in which the cushioning springs will be maintained in a dust proof lubricated condition, whereby heating of such parts and rusting of the cushioning springs will be prevented.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a side elevation of a wheel, constructed in accordance with this invention, a portion of one of the side plates being broken away to show the sectional tire receiving shoe. Fig. 2 is an enlarged transverse sectional view on the line 2—2 of Fig. 1. Fig. 3 is an enlarged longitudinal sectional view on the line 3—3 of Fig. 2. Fig. 4 is a sectional view, taken substantially on the line 4—4 of Fig. 3. Fig. 5 is an enlarged detail horizontal sectional view of a portion of the sectional tire receiving shoe, and illustrating the arrangement of the anti-friction devices. Fig. 6 is a detail view of a portion of the resilient tire. Fig. 7 is a detail perspective view of one of the outer closure plugs and its cross head. Fig. 8 is an enlarged detail longitudinal sectional view of a portion of the sectional tire receiving shoe. Figs. 9 and 10 are enlarged detail sectional views, illustrating the construction and arrangement of the transverse webs or ribs, which interlock the tire with the sectional shoe.

Like numerals of reference designate corresponding parts in all the figures of the drawings.

In the accompanying drawings in which is illustrated the preferred embodiment of the invention, 1 designates a rigid inner vehicle wheel, designed to be of any preferred construction and having its felly 2 connected with the hub 3 and maintained in rigid relation with the same by spokes 4. The felly 2 is provided at intervals with radially arranged openings 5 for the reception of cylindrical casings 6, provided with enlarged outer ends 7 and having their inner ends 8 projecting from the inner periphery of the felly and provided with exterior right hand threads 9, which are engaged by polygonal cap nuts 10. The enlarged outer ends of the heads 7 of the cylindrical casings fit in recesses 11 in the outer periphery of the felly and are arranged in flush relation with the said outer face and provided at their outer periphery with lugs or projections 7ª, adapted to be embedded in the wood of the felly to hold the inner casings against rotary movement. The cap nuts engage the inner periphery of the felly and maintain the cylindrical casings rigidly in the radial openings of the felly. Disks 12 of felt, or other suitable packing material are fitted within the cap nuts and are interposed between the same and the inner ends of the cylindrical casings to provide oil tight connections. The enlarged outer ends 7 also receive gaskets or packings 13 of felt, or any other suitable material, and are interiorly threaded at 14 for adjustable exterior threaded metallic glands or rings 15. The enlarged ends or heads 7 form stuffing boxes for telescopic tubular sections or members 16, slidable through the glands or rings 15, said rings 15 being adapted to compress the gaskets or packings to form oil tight joints at the outer ends of the casings 6 and provided with opposite recesses 15ª to enable them to be readily engaged by a spanner or other tool.

The telescopic tubular sections or members operate as plungers, and are actuated in their outward movement by coiled cushioning springs 17, interposed between outer closure plugs 18 and inner tensioning plugs 19. The coiled springs may be of any desired size and strength, and although only one coiled spring is shown in each of the annular series of cushioning devices, yet it will be apparent that a plurality of springs may be used. The outer plugs 18, which are threaded to engage corresponding interior screw threads of the telescopic tubes or sections, are provided with flanges 20 to fit over the outer end edges of the same, gaskets or packings 21 being interposed between the flanges 20 and the outer ends of the telescopic tubes or sections 16 to prevent leakage of the lubricant. The lubricant in practice is designed to be cup grease or compression oil, which will be adapted to lubricate the telescopic casings and tubular members in their relative movement, and at the same time prevent the springs from rusting while dust, dirt and other accumulation are excluded by the packings from the interior of the casings and the telescopic sections or members. The tensioning adjusting plugs 19 have left hand screw threads 22, which engage corresponding left hand interior screw threads 23 in the inner ends of the casing 6, and they are also provided with reduced portions 19ª, extending into the inner ends of the coiled springs and adapted to maintain the same in proper position on the tensioning adjusting plugs. The tensioning plugs are also provided with a groove 24 to receive the blade of a screw driver, and if they should become unscrewed sufficiently to carry them inwardly into engagement with the right hand threaded screw caps or nuts 10, they will operate as locks to prevent the screw caps or nuts from accidentally unscrewing as any tendency of the tensioning adjusting plugs to rotate the caps or nuts will operate to tighten the latter. This will prevent the vibrations incident to the cushioning action of the springs from loosening the screw caps or nuts of the inner ends of the cylindrical casings 6; and accidents which might result from the giving away of the spring supports will be prevented.

The outer tubular sections or members 16 are provided at their inner ends with outwardly projecting lugs 25, operating in guide grooves 26, formed in the inner faces of the inner sections or casings 6 and extending longitudinally thereof from the inner ends of the same to the outer enlarged ends 7 and closed at their outer terminals to form stops for limiting the outward movement of the tubular sections or members 16. This enables the cushioning devices to be mounted in position on the felly of the wheel prior to assembling the tire 27 and a sectional tire receiving shoe. The lugs 25 and the grooves 26 guide the outer tubular sections 16 in their radial reciprocatory movement, and also prevent rotary movement of the outer sections or members 16 in the inner sections or casings 6.

The sectional tire receiving shoe, which is of annular form, is of greater diameter than the felly of the wheel and is located beyond and in substantial parallelism with the same between the planes of the side faces of the felly to which are secured annular side plates 28, projecting from the felly to form a housing for the sectional shoe and the tire to protect the same from dust, dirt and other accumulation. About one third of the tire is normally located within the housing formed by the side plates, and when the tire is compressed at the bottom of the wheel, it is forced inwardly between the side plates and the greater portion of such compressed section of the tire is located between the side plates, so that there is no liability of the tire skidding off the wheel. The side plates are secured to the side faces of the felly by transverse bolts 30, or other suitable fastening devices, and they reinforce and strengthen the wheel at the felly. While the bolts 30 are shown and may be employed for detachably securing the side plates to the felly, yet the side plates may be secured to the felly in any other suitable manner and the sectional tire receiving shoe may, as hereinafter fully explained, be placed on and removed from the wheel without detaching the side plates.

The annular tire receiving shoe is composed of a series of sections 31, pivotally or hingedly connected with one another by means of side links 32, arranged in pairs and located at opposite sides of and overlapping the adjacent ends of the sections, which are provided with side recesses 35 to receive the side links for arranging the same in flush relation with the side faces of the sections. The ends of the sections of the shoe are spaced apart, and their end faces are beveled or cut away at the outer portions 36 to permit pivotal movement of the sections without contacting with one another, and the inner portions of the end faces of the sections are squared or radially arranged, as clearly shown in Fig. 8 of the drawings. The links 32 are connected with the shoe sections by transverse pivots 37, piercing the links and the end portions of the shoes, which are fulcrumed centrally on transverse cross heads 38, formed integral with the plugs 18 of the yieldably mounted radially movable tubular sections or members 16. The cross heads 38, which are of a length less than the space between the side plates to enable them to be readily rotated, have rounded outer faces 39 and fit in transverse grooves 40, approximately semi-circular in cross section and terminating short of the side faces of the shoe sections, whereby the cross heads are interlocked with the shoe sections and the latter held against lateral and longitudinal movement. By interlocking the shoe sections with the cross heads of the extensible spring actuated sections or members 16, the latter, which are firmly mounted in the felly, are subjected to the lateral strain and the side plates are relieved of such strain. The transverse grooves, which form bearings for the rounded cross heads, are of sufficient depth and sufficient number to effectually prevent the sectional tire receiving shoe from creeping on the inner wheel. The compression or inward movement of a section or portion of the tire receiving shoe strengthens and increases the effective length of the same and permits a pivotal action of the shoe sections on the fulcruming cross heads.

In order to eliminate any friction resulting from any contact of the shoe sections with the side plates, the said shoe sections may be provided with anti-friction devices consisting of rollers 41, mounted on pivots or spindles 42 and arranged in bifurcations 43 of transverse bars 44. The transverse bars 44 are secured by screws 45, or other suitable fastening means in transverse openings 46, arranged at the center of the shoe sections. The pivots or spindles 42 extend across the bifurcations and are mounted in perforations at opposite sides thereof. The anti-friction rollers project slightly beyond the plane of the side faces of the shoe and are adapted to ride on the inner faces of the side plates, as clearly illustrated in Figs. 2 and 5 of the drawings. Although each of the shoe sections is equipped with only one pair of anti-friction rollers, it will be apparent that any number of the same may be employed.

The sections of the shoe are provided with concave outer faces $46^a$, forming an annular groove or channel to receive the tire 27, which is round or circular in cross section. The tire, which is flexible and resilient, consists of a plurality of circumferentially arranged courses of spirally coiled steel rods preferably circular in cross section, each course being endless and extending entirely around the wheel and consisting of an endless rod having its terminals united by electric welding, or connected by other suitable means. In the accompanying drawings is illustrated a tire having three spiral courses 47, 48 and 49 of different diameters arranged one within the other, but the number may be varied to adapt the tire to the character of the vehicle on which it is to be used. The steel rods of the several courses increase in diameter from the inner course outward, the material of the intermediate spiral course being of slightly greater diameter than the material of the inner course, and the material of the outer course being of greater diameter than that of the intermediate course. The coiling of the steel rods of the tire is alternately reversed, so that the coils or convolutions of the contacting courses cross each other and the increase in size of the material enables the several courses to be composed of an equal number of coils or convolutions and permits the coils or convolutions to cross one another at the proper points, and effectually prevents any piling up of the coils or convolutions or the cutting into one course by the coils or convolutions of another course. The courses are tightly wound, and the inner course is embraced and confined within the intermediate course, which is in turn confined within the outer course. The outer course is supported throughout its length by the intermediate course, which in turn is supported by the inner course, and there is a mutual co-action between the several courses in supporting, sustaining and confining one another. Through this particular construction and arrangement, the material of the several courses may be wound as tightly as desired, and the reverse winding enables the spiral course to be compressed within another spiral course. The reverse coiling and the crossing of the coils or convolutions of the several courses form practically a weave and result in the production of a yieldable circumferentially flexible tire of great strength and durability, and at the same time the ringing tones or noises, which are present in loose coils or convolutions, are eliminated, and the tire is rendered practically noiseless so far as the action of the coils or convolutions on each other is concerned.

In order to prevent the tire from creeping on the shoe, the sections thereof are provided with transversely disposed ribs 50, formed integral with the shoes and preferably located at opposite sides of the center of the shoe sections and extending across the end portions of the same, and tapered cross sectionally to fit the tapering space between the adjacent coils or convolutions. The ribs, which are tapered longitudinally toward their ends, are set or arranged at the same angle as the coils or convolutions and are disposed in parallelism with the same, and extend into the space between the outer portions of the coils or convolutions of the outer course of the tire, and they prevent any longitudinal movement of the tire on the shoe and in operating in this manner, they also serve to hold the coils or convolutions together and prevent any separation of the same in a direction longitudinally of the tire. The number of ribs may be varied within certain limits and still preserve the smooth concave faces of the sections of the annular shoe, and as the shoe sections have a pivotal action through the link connections and the fulcruming cross heads, they are adapted to adjust themselves to any position of the tire, and the ribs are maintained in constant engagement with the coils.

The tire is designed to be equipped with an interiorly arranged chain 51, extending around the wheel and lying against the inner portion of the tire and adapted to effectually prevent the tire from stretching sufficiently to leave the wheel. The chain, which may be composed of any desired form of links, does not interfere with the free cushioning action of the tire and the yieldably supported sectional shoe, but when stretched to its limit, it constitutes an inextensible anchoring member, which will effectually prevent the tire from jumping off the wheel.

The chain is especially designed for use in racing equipments, and will enable an automobile or other motor vehicle to be driven at a high rate of speed without liability of the tire being thrown or forced off the wheel through such excessive speed. In applying the chain, the terminals of the latter are first connected and then the terminals of the material of the several courses of the tire are electrically welded.

The tire is applied to and removed from the wheel by removing the screw caps or nuts, and the tensioning adjusting plugs and allowing a portion of the radially slidable sections or members to move inwardly to permit the sectional shoe to collapse partially. This will enable the tire to be placed on the wheel or taken off of the same without detaching either of the side plates. The tension is, of course, taken off the chain 51 and there is sufficient play at the pivotal connections between the links 32 and the sections 31 of the shoe, so that the latter will not interfere with the removal of the tire. When the tire is placed on the wheel, the springs are adjusted to the proper tension and the screw caps or nuts placed in position.

In the operation of the wheel only the bottom portion of the tire and the sectional shoe are subjected to pressure, and in this manner the operation of the invention is similar to the cushioning action, which takes place in a pneumatic tire, but with this exception the tire 27 is not collapsed and preserves at all times its round running tread. Only the three springs at the bottom of the wheel are in motion or operation in the cushioning action, and with a thirty-six inch wheel, each spring will be operated only once while the wheel is traveling approximately nine feet, and when a vehicle is traveling at the rate of thirty miles an hour, the springs will operate at the rate of four and eight-tenths times per second, which is insufficient to materially heat the telescopic sections or members and the springs, especially when the same are maintained in a thoroughly lubricated condition. When the tire is compressed at the bottom of the wheel, the inward movement of the compressed portion operates to crowd the bottom coils or convolutions together and close the same, and when such coils are closed in this manner there is no liability of the tire picking up gravel, and dust, dirt and other accumulation will not be forced into the tire, as they will be effectually excluded by such close arrangement of the coils and the housing formed by the side plates.

The coils or convolutions of the tire form a continuous corrugated tread surface and operate as an effective anti-skidding device. When the tread portion of a tire becomes worn and smooth, the tire may be rotated on the wheel by a jack, or other suitable tool to arrange the worn tread portion in the groove or channel and to bring the unworn portion to the outer side to form a new tread, and after such fresh portion of the tire has become worn, the tire may then be again turned by quarter turns until the entire exterior corrugated surface is worn smooth.

What is claimed is:—

1. A wheel of the class described provided with a tire consisting entirely of a plurality of courses of reversely wound spirally coiled material of different diameters arranged one within the other, each course consisting of a single continuous spring and the material of the courses increasing in diameter outwardly from the interior, said springs forming a flexible tubular tire having practically solid walls with exterior transverse corrugations.

2. A wheel of the class described provided with a tire consisting of inner, intermediate and outer courses of spirally coiled spring metal, each course consisting of a single continuous spring, the coiling of the intermediate course being the reverse of the inner and outer courses and having its coils or convolutions crossing those of the inner and outer courses, and the materials of the several courses increasing in diameter from the inner course to the outer course, said springs forming a circumferentially yieldable tire.

3. A wheel of the class described provided with a tire comprising a plurality of circumferentially arranged courses of spirally coiled material, each course consisting of a single continuous spring having its coils arranged in close proximity to one another, said courses having a uniform number of coils or convolutions and reversely coiled to cross the coils or convolutions, and the material of the successive courses being increased in diameter outwardly from the interior of the tire.

4. A wheel of the class described including a tubular tire consisting entirely of transversely disposed contacting coils or convolutions forming exterior corrugations, said wheel having a groove or channel presenting a smooth concave face to the tire and provided at intervals with curved ribs disposed transversely with relation to the tire and tapered cross sectionally and fitting between the coils or convolutions in the corrugations formed by the same, said groove or channel presenting smooth faces to the tire at the space between the ribs, which prevent a separation of the coils or convolutions.

5. A wheel of the class described including a tire consisting of spirally coiled metal, an annular shoe composed of pivotal sections provided with spaced projecting means for engaging the coils or convolutions of the tire to prevent the latter from creeping, and cushioning devices provided with projecting fulcrums arranged centrally of the shoe sections and permitting a pivotal action of the same on the cushioning devices and interlocking the latter with the shoe to hold both the tire and the shoe against circumferential creeping around the wheel.

6. A wheel of the class described including a tire, an annular shoe receiving the tire and composed of sections provided at their inner faces with transverse grooves, and an annular series of cushioning devices loosely mounted in and projecting from the wheel and provided at their outer ends with cross heads loosely fitting in the grooves of the shoe sections and unattached to the latter and forming fulcrums for the said sections and interlocking the latter and the cushioning devices to prevent the former from creeping circumferentially around the wheel.

7. A wheel of the class described including a fixed inner wheel having a felly, a tire arranged in spaced relation with the inner wheel, a sectional shoe receiving the tire and arranged in spaced relation with the inner wheel, and an annular series of cushioning devices mounted on the inner wheel and each comprising an inner tubular casing extending through the felly of the wheel and provided at the outer end with a stuffing box, said inner casing having a closure cap or nut at its inner end engaging the felly and coöperating with the stuffing box to clamp the same, an outer radially mounted telescopic member fitting the interior of the said tubular casing and guided by the same and provided at its outer end with means for supporting the adjacent section of the shoe, and a coiled spring arranged within the casing for urging the outer member outwardly.

8. A wheel of the class described including a shoe, a tire arranged on the shoe, and a series of cushioning devices each comprising an inner tubular casing provided at its inner end with exterior and interior right and left hand screw threads, an outer telescopic tubular member supporting the shoe, a coiled spring arranged within the casing and the telescopic member for urging the latter outwardly, a tensioning screw threaded to engage the interior threads of the inner casing and located within the same, and a screw cap threaded to engage the exterior threads of the said casing and closing the inner end thereof, the screw plug being adapted when at the limit of its downward movement to engage the cap, whereby both the screw and the cap are locked against rotary movement.

9. A wheel of the class described including a rigid inner wheel having a felly, side plates secured to the felly and projecting therefrom, an annular sectional shoe extending around the inner wheel in spaced relation with the felly and provided at intervals at the inner faces of the sections with shallow transverse grooves terminating short of the side faces of the shoe, a tire arranged on the shoe, and an annular series of cushioning devices mounted on said felly and comprising an inner casing, a tubular telescopic member slidable in the casing and having an interiorly threaded outer end, a threaded plug closing the outer end of the said member and provided with a cross head loosely fitting in one of the shallow grooves of the shoe and unattached to the same, whereby the shoe is interlocked with the cushioning devices and the plugs held against rotary movement, and a spring housed within the said casing for urging the said member outwardly.

10. A wheel of the class described including a rigid inner wheel having a felly, side plates secured to and projecting beyond the felly, a tire, a sectional shoe receiving the tire and arranged between the side plates and provided with transverse openings, cushioning devices mounted on the felly and supporting the shoe, anti-friction devices consisting of transverse bars extending through the transverse openings of the sections of the shoe, and anti-friction rollers mounted in the ends of the bars and carried by the latter and arranged to bear against the inner faces of the said plates.

11. A wheel of the class described including a rigid inner wheel, a tire arranged in spaced relation with the inner wheel and consisting of coiled material forming exterior corrugations, an annular sectional shoe extending around the inner wheel and spaced therefrom and provided with a channel receiving the tire and having transverse ribs arranged at intervals and projecting between the coils or convolutions of the tire to interlock the latter with the shoe and prevent the tire from creeping thereon, said sections being also provided at their inner faces with transverse grooves, and cushioning devices mounted on and projecting from the inner wheel and provided with cross heads fitting in the grooves of the sections and unattached thereto and interlocking the shoe and the cushioning devices to prevent the shoe and the tire from creeping around the inner wheel.

12. A wheel of the class described including a rigid inner wheel, a tubular circumferentially flexible tire arranged in spaced relation with the inner wheel and consisting of spirally coiled material forming exterior corrugations, an annular sectional shoe extending around the inner wheel in spaced relation therewith and provided with a channel receiving the tire, cushioning devices loosely mounted on and projecting from the inner wheel and forming fulcrums for the sections of the annular shoe, said shoe being provided with means for engaging the coils or convolutions of the tire and the said cushioning devices, whereby the tire, the shoe and the cushioning devices are interlocked with one another to prevent the tire and the shoe from creeping around the wheel, and means located within the tubular tire for retaining the same in engagement with the sections of the shoe.

In testimony that I claim the foregoing as my own, I have hereto affixed my signature in the presence of two witnesses.

ROBERT E. L. CROSBY.

Witnesses:
JOHN H. SIGGERS,
EDITH L. BROWN.